May 27, 1941.                 H. GANG                    2,243,798
       COMBINED ELECTRIC MOTOR AND CLUTCH CONTROL
          MECHANISM FOR CALCULATING MACHINES
               Filed Jan. 9, 1940          2 Sheets-Sheet 2
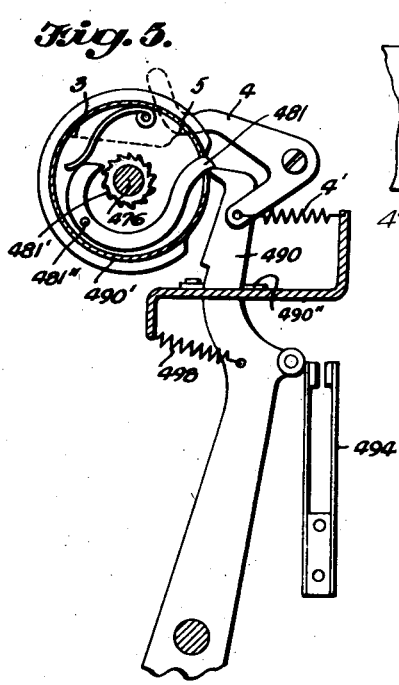
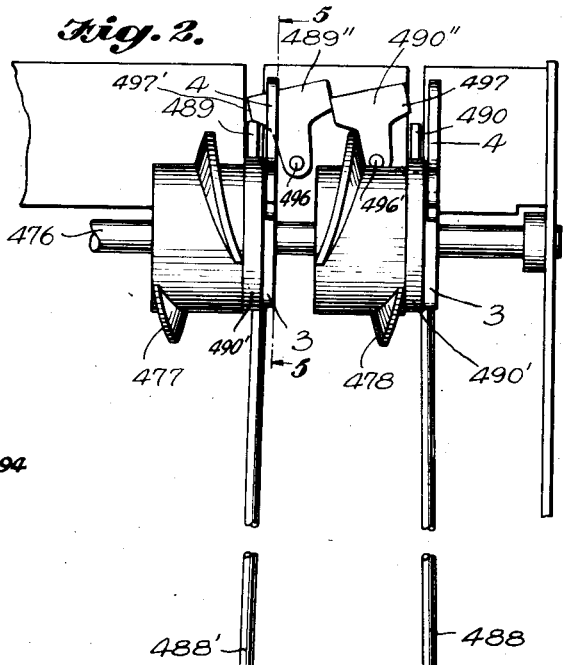
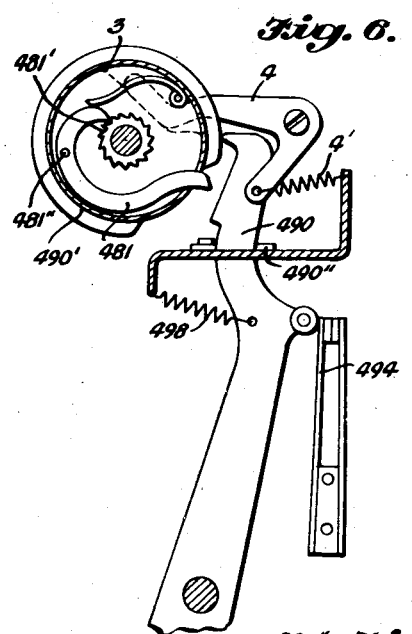
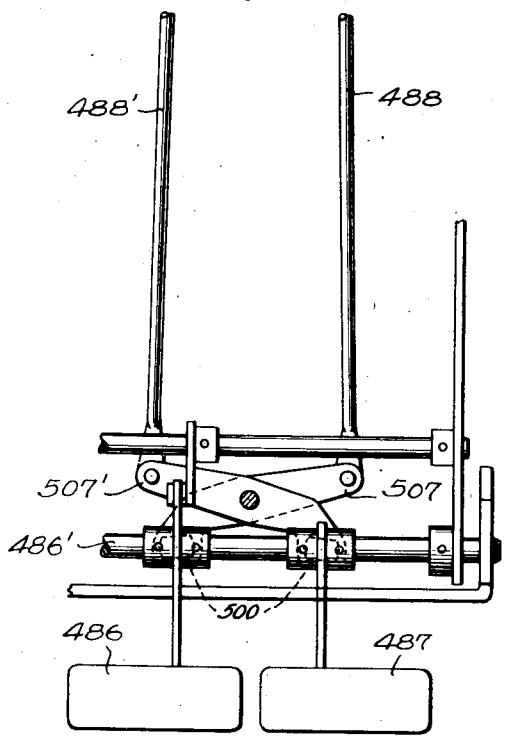
Inventor
Herman Gang
C.W. Anderson & Son
By
Attorneys Patented May 27, 1941

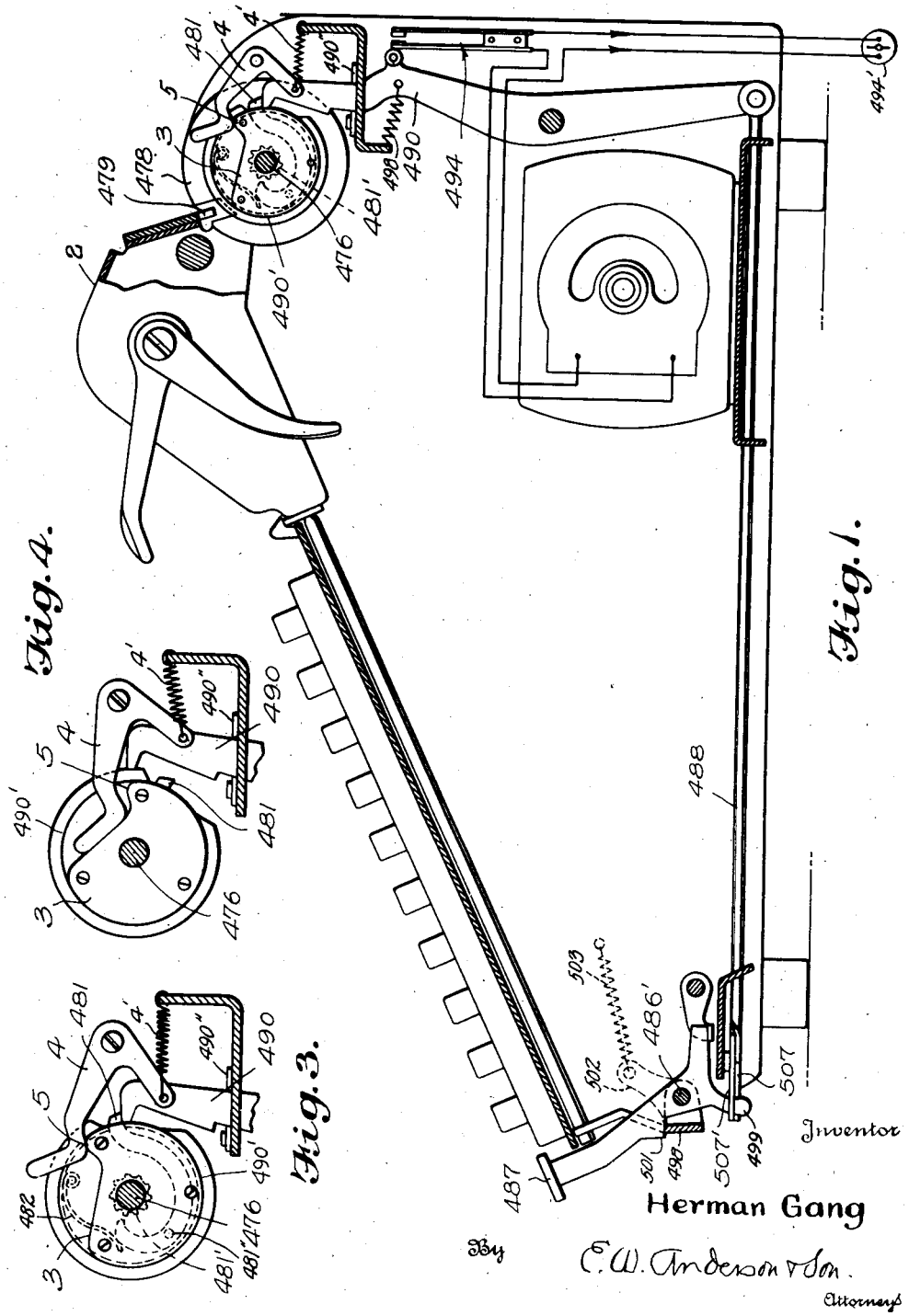

2,243,798

UNITED STATES PATENT OFFICE 2,243,798

COMBINED ELECTRIC MOTOR AND CLUTCH CONTROL MECHANISM FOR CALCULATING MACHINES

Herman Gang, Livingston, N. J., assignor to Monroe Calculating Machine Company, Orange, N. J., a corporation of Delaware Application January 9, 1940, Serial No. 313,113

7 Claims. (Cl. 192—.02)

The invention relates to combined electric motor and clutch control mechanism for calculating machines, such as disclosed in the U. S. patent to Overbury, No. 1,964,478, dated June 26, 1934. In this machine should one or both of the carriage shifting keys be inadvertently manipulated while the primary switch remains open, there results ineffective partial setting of the parts that control the electric motor and the clutch which may result in delay and inconvenience and sometimes in clash of the mechanism, either upon closure of the primary switch or upon subsequent depression of a different motor operation key.

An object of the invention is to provide means to insure effective setting of said parts in such cases and to avoid such delay and inconvenience and clash of the mechanism.

The invention consists in the novel construction and combination of parts as hereinafter set forth in the claims.

In the accompanying drawings:

Figure 1 is a side view of the invention as applied, with parts of the machine in section.

Figure 2 is a plan view of the invention as applied, parts being broken away.

Figure 3 is a detail side view of the cam, the spring-urged lever and the clutch control lever in normal position, parts being broken away.

Figure 4 is a similar view with the cam snapped partially around by the spring-urged lever and the clutch control lever engaging the arcuate portion of the periphery of the clutch housing.

Figure 5 is a section on the line 5—5, Figure 2, with the clutch housing in section, the cam and a portion of the lever bearing thereon in dotted lines, the clutch control lever in normal position, the clutch disengaged and the secondary switch open, parts being broken away.

Figure 6 is a view similar to Figure 5, with the clutch control lever retracted, the clutch engaged and the secondary switch closed.

Figure 7 is a detail plan view of the elements or dogs forming part of the means for maintaining one of the clutch control levers against retraction during the time that the other clutch control lever is retracted, the showing being partially diagrammatic and parts broken away, said dogs being shown in dotted lines in the alternative position thereof assumed when the other clutch control lever is retracted.

In these drawings, the numeral 2 designates the accumulator carriage, provided with means for shifting the same in either of opposite directions upon manipulation of either of right and left shift keys, 487, 486, these keys being levers fulcrumed upon shaft 486' and having operating connections 507, 507' with rods 488, 488' connecting the keys with the lower arms of the spring-urged identical clutch control levers 490, 489, said levers being fulcrumed intermediately of their lengths and the upper ends of the upper arms thereof normally contacting identical spring-urged pawl clutch members 481 to maintain the latter retracted from identical ratchet wheel clutch members 481' fast upon the shaft 476 to thereby render both clutches normally ineffective. The pawl clutch members 481 are fulcrumed at 481'' to and carried by identical clutch housings 490' loose upon shaft 476 and are urged by identical springs 482. The keys 487, 486 have the identical tail arms 499 thereof engaging identical perforations 500 (Fig. 2) of the lever connections 507, 507'.

The clutch control levers 490, 489 being respectively retracted upon manipulation of the respective carriage shifting keys are adapted to close the contacts of the secondary motor switch 494. A normally open primary manual switch 494' is provided either in the electrical cord leading to the power outlet or in the machine itself to turn the current on and off.

The primary switch being first closed to turn the current on, manipulation of either carriage shifting key will retract the related clutch control lever from the spring-urged pawl clutch member to render the related clutch effective and close the contacts of the secondary motor switch to start the motor, whereupon the carriage will be shifted due to worm wheels 477, 478 engaging notches of a rack 479 secured to the carriage. The upper end of the upper arm of each clutch control lever 490, 489, upon retraction of said lever, is adapted to contact and ride upon the arcuate portion of the periphery of the housing 490' of the related clutch to maintain the lever in its retracted position, said lever being released from said arcuate peripheral portion at the end of the carriage shifting cycle to again render the clutch ineffective and open the contacts of the secondary motor switch. The keys 487, 486 have identical shoulders 501 engaging bail lever 498, the latter being fulcrumed at 486' and having an arm 502 to which is connected a coiled spring 503, said bail lever being depressed upon manipulation of either of said keys, against the tension of said spring. Thus, the primary switch being first closed, upon manipulation of either of said keys, the key and the bail lever will be held in depressed position until the release of the related clutch control lever at the end of the carriage shifting cycle, when the bail lever and the key will be restored to normal position by spring 503.

Means shiftable by either clutch control lever 490, 489, in the retraction thereof to render the related clutch effective, into the path of movement of the other lever, are provided to maintain the latter against retraction and the other clutch ineffective, during the carriage shifting cycle, said means including elements or dogs 490", 489" fulcrumed respectively at 496, 496' to the stationary framing.

These dogs have their inner lateral edges in wiping engagement so that when the one dog 490" is actuated from the dotted line position of Figure 7 in consequence of the retraction of the clutch control lever 490 which contacts an outer lateral shoulder 497 of the dog, the other dog 489" will be thereby actuated to bring the outer lateral shoulder 497' thereof into the path of movement of the other clutch control lever 490 as shown in the full line position of Figure 7 to maintain the latter against retraction and the related clutch ineffective during the carriage shifting cycle. During this cycle the clutch control lever 490 being maintained against retraction as stated, shoulder 497' will be held in the stated position.

In practice it is found that should one of the carriage shifting keys be inadvertently manipulated while the primary switch remains open, there will result ineffective partial setting of the parts, a clutch pawl 481 engaging the related ratchet wheel 481', but since the clutch housing 490' will not be rotated, the means for rendering the other clutch ineffective and maintaining the secondary switch closed will be subject to finger pressure. Upon release of the carriage shifting key under these conditions, the clutch control lever will be restored to normal position by its spring 498, and the upper end thereof will seat upon the beveled outer end of the clutch pawl, in which position the clutch control lever will not be sufficiently displaced to hold the dogs 489", 490" in position to prevent depression of the other carriage shifting key. The machine is now set to shift the carriage in a given direction, and if the opposite shifting key is manipulated, either before or after the primary switch is closed, both carriage shifting clutches would attempt to operate as soon as the primary switch is closed and there would result clash of the mechanism which may be serious.

In order to make the machine foolproof therefore, means are provided to partially rotate the clutch housing upon manipulation of a carriage shifting key, irrespective of whether the primary switch has been initially closed or not, whereby the arcuate portion of the periphery of said housing will be always thereupon positioned to contact the free end of the upper arm of the clutch control lever and maintain said lever in its retracted position, as a consequence of which the secondary switch will be closed, the one clutch rendered effective, and the means for rendering the other clutch ineffective will be shifted.

This means includes for each clutch, a cam 3 fast to the clutch housing, and a spring-urged lever 4, (the spring of which is designated 4') bearing on the shoulder 5 of the cam, which latter is given a slight lead, as shown in Figure 3, so that upon manipulation of a carriage shifting key, the cam and the clutch housing will be tripped or snapped partially around by the spring-urged lever, to the position shown in Figure 4. The lever 4 is returned to normal position by said cam during the carriage shifting cycle.

Since the device herein disclosed acts to hold the secondary switch closed, it is obvious that upon closing of the primary switch, the partially set shift mechanism will become operative, and it will not be necessary for the operator to manipulate the keys in order to restore the machine to normal condition.

I claim:

1. In a combined electric motor and clutch control mechanism for calculating machines, the combination with motor driven means for performing either of two different functions including a manual primary switch and a secondary switch, two normally ineffective clutches, a spring-urged control device for each clutch retractible to render the clutch effective, means including manipulable keys for retracting the respective clutch control devices and closing the secondary switch, and means operable with the primary switch closed, upon manipulation of either key, for maintaining the related clutch control device retracted, the related clutch effective and the other clutch ineffective during the performance of the particular function; of means operable with the primary switch open, upon manipulation of either key, for maintaining the related clutch control device retracted, the related clutch effective and the other clutch ineffective pending closing of the primary switch.

2. In a combined electric motor and clutch control mechanism for calculating machines, the combination with motor driven means for performing either of two different functions including a primary switch and a secondary switch, two normally ineffective clutches, a spring-urged control device for each clutch retractible to render the clutch effective, means including manipulable keys for retracting the respective clutch control devices and closing the secondary switch and means operable with the primary switch closed, upon manipulation of either key, for maintaining the related clutch control device retracted, the related clutch effective and the other clutch ineffective during the performance of the particular function including means shiftable by one clutch control device into the path of movement of the other device; of means operable with the primary switch open, upon manipulation of either key, for maintaining the related clutch control device retracted, the related clutch effective and the shiftable means in the path of movement of the other clutch control device to render the other clutch ineffective, pending closing of the primary switch.

3. In a combined electric motor and clutch control mechanism for calculating machines, the combination with motor driven means for performing either of two different functions including a manual primary switch and a secondary switch, two normally ineffective clutches, a spring-urged control device for each clutch retractible to render the clutch effective and close the secondary switch, means including manipulable keys for retracting the respective clutch control devices and means operable with the primary switch closed, upon manipulation of either key, for maintaining the related clutch control device retracted, the related clutch effective, the other clutch ineffective and the secondary switch closed during the performance of the particular function; of means operable with the primary switch open, upon manipulation of either key, for maintaining the related clutch control device retracted, the related clutch effective, the other clutch ineffective and the secondary switch closed, pending the closing of the primary switch.

4. In a combined electric motor and clutch control mechanism for calculating machines, the combination with motor driven means for performing either of two different functions including a manual primary switch and a secondary switch, two normally ineffective clutches, a spring-urged control device for each clutch retractible to render the clutch effective and close the secondary switch, means including manipulable keys for retracting the respective clutch control devices and means operable with the primary switch closed, upon manipulation of either key, for maintaining the related clutch control device retracted, the related clutch effective, the other clutch ineffective and the secondary switch closed during the performance of the particular function including means shiftable by one clutch control device into the path of movement of the other devices; of means operable with the primary switch open, upon manipulation of either key, for maintaining the related clutch control device retracted, the related clutch effective, the shiftable means in the path of movement of the other clutch control device to render the other clutch ineffective, and the secondary switch closed, pending closing of the primary switch.

5. In a combined electric motor and clutch control mechanism for calculating machines, the combination with motor driven means for performing either of two different functions including a manual primary switch and a secondary switch, two normally ineffective clutches, a spring-urged control device for each clutch retractible to render the clutch effective and close the secondary switch, means including manipulable keys for retracting the respective clutch control devices and means operable with the primary switch closed, upon manipulation of either key, for maintaining the related clutch control device retracted, the related clutch effective, the other clutch ineffective and the secondary switch closed during the performance of the particular function including a loose member carrier for each clutch rotatable to bring a peripheral portion thereof into contact with the related clutch control device; of means operable with the primary switch open, upon manipulation of either key, for maintaining the related clutch control device retracted, the related clutch effective, the other clutch ineffective and the secondary switch closed pending closing of the primary switch including means for partially rotating the related carrier.

6. In a combined electric motor and clutch control mechanism for calculating machines, the combination with motor driven means for performing a given function including a manual primary switch and a secondary switch, a normally ineffective clutch, a spring-urged control device for said clutch retractible to render the clutch effective and close the secondary switch, means including a manipulable key for retracting the clutch control device and means operable with the primary switch closed, upon manipulation of said key, for maintaining the clutch control device retracted, the clutch effective and the secondary switch closed during the performance of said function; of means operable with the primary switch open, upon manipulation of said key, for maintaining the clutch control device retracted, the clutch effective and the secondary switch closed, pending closing of the primary switch.

7. In a combined electric motor and clutch control mechanism for calculating machines, the combination with motor driven means for performing a given function including a manual primary switch and a secondary switch, a normally ineffective clutch, a spring-urged control device for said clutch retractible to render the clutch effective and close the secondary switch, means including a manipulable key for retracting the clutch control device and means operable with the primary switch closed, upon manipulation of said key, for maintaining the clutch control device retracted, the clutch effective and the secondary switch closed during the performance of said function including a carrier for a member of said clutch rotatable to bring a peripheral portion thereof into contact with said clutch control device; of means operable with the primary switch open, upon manipulation of said key, for maintaining the clutch control device retracted, the clutch effective and the secondary switch closed, pending closing of the primary switch including means for partially rotating said carrier.

HERMAN GANG.